(12) United States Patent
Grabarnik et al.

(10) Patent No.: US 7,343,604 B2
(45) Date of Patent: Mar. 11, 2008

(54) METHODS AND APPARATUS FOR CREATION OF PARSING RULES

(75) Inventors: Genady Grabarnik, Thornhill (CA); Sheng Ma, Ossining, NY (US); Chang-shing Perng, Bedford Hills, NY (US); Abdolreza Salahshour, Raleigh, NC (US); David H. Thoenen, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 10/627,824

(22) Filed: Jul. 25, 2003

(65) Prior Publication Data

US 2005/0022207 A1    Jan. 27, 2005

(51) Int. Cl.
*G06F 9/54* (2006.01)
*G06F 15/177* (2006.01)

(52) U.S. Cl. ............. 719/313; 719/318; 719/311; 709/223; 709/228

(58) Field of Classification Search ............ None
See application file for complete search history.

(56) References Cited

U.S. PATENT DOCUMENTS

| | | | |
|---|---|---|---|
| 5,485,618 A | | 1/1996 | Smith |
| 5,557,776 A | | 9/1996 | Brown et al. |
| 5,963,943 A | * | 10/1999 | Cummins et al. ............ 707/10 |
| 5,970,449 A | | 10/1999 | Alleva et al. |
| 6,014,680 A | * | 1/2000 | Sato et al. ................. 715/513 |
| 6,233,726 B1 | | 5/2001 | Bowman et al. |
| 6,367,068 B1 | | 4/2002 | Vaidyanathan et al. |
| 6,411,974 B1 | * | 6/2002 | Graham et al. ............ 715/531 |
| 6,427,146 B1 | * | 7/2002 | Chu .............................. 707/3 |
| 6,493,694 B1 | * | 12/2002 | Xu et al. ..................... 706/47 |
| 6,519,617 B1 | | 2/2003 | Wanderski et al. |
| 2002/0078406 A1 | * | 6/2002 | Kondoh et al. ............ 714/48 |
| 2004/0025173 A1 | * | 2/2004 | Levonai et al. ............ 719/328 |

(Continued)

OTHER PUBLICATIONS

P. Horn, "Autonomic Computing: IBM's Perspective on the State of Information Technology," IBM Research, pp. 1-38, Oct. 2001.

(Continued)

*Primary Examiner*—William Thomson
*Assistant Examiner*—Abdou K Seye
(74) *Attorney, Agent, or Firm*—Mark Wardas; Ryan, Mason & Lewis, LLP

(57) ABSTRACT

Techniques for parsing rule creation are provided. A technique for constructing one or more message parsing rules may comprise the following steps. First, message data representing past messages, for example, associated with a network, an application and/or a system being analyzed, is obtained. For example, this may involve reading the past or historical message data from messages logs or having a system point to the message data in existing data storage. Parsing rules are then generated by a process from one or more existing rule templates and/or based on user selection and classification of at least a portion of a message. For example, the user may choose a message part and demonstratively classify the part, for example, as a positive or negative example. The generated rules may then be stored for access by a rule-based parsing system such as a message adaptation system. Prior to generation of the one or more parsing rules, a message structure may be established upon which generation of the rules may be based.

18 Claims, 8 Drawing Sheets

U.S. PATENT DOCUMENTS

2004/0250259 A1* 12/2004 Lauterbach et al. ........ 719/315

OTHER PUBLICATIONS

H. Mannila et al., "Discovery of Frequent Episodes in Event Sequences," University of Helsinki, Department of Computer Science, pp. 1-45, 1997.

R. Agrawal et al., "Mining Association Rules Between Sets of Items in Large Databases," Proceedings of the 1993 ACM SIGMOD Conference, pp. 1-10, May 1993.

R. Srikant et al., "Mining Sequential Patterns: Generalizations and Performance Improvements," Procedures of the Fifth International Conference on Extending Database Technology, 15 pages, 1996.

* cited by examiner

```
<?xml version="1.0" encoding="UTF-8" ?>
<schema targetNamespace="http://MsgStructure.xsd"
xmlns:xs="http://www.w3.org/2001/XMLSchema" elementFormDefault="qualified">
    <element name="MsgStructure">
        <complexType>
            <attribute name="multiline" type="boolean"
default="false"/>
            <attribute name="eventStart" type="string"/>
            <attribute name="eventEnd" type="string"/>
            <attribute name="separator" type="string" default="\s+"/>
            <attribute name="msgType" type="MsgTypeType"/>
            <attribute name="glueing" type="string" default=";"/>
            <attribute name="matchContinue" type="string"/>
        </complexType>
    </element>
    <simpleType name="MsgTypeType">
        <restriction base="NCName">
            <enumeration value="TEC_RECEPTION_MSG"/>
            <enumeration value="DB2_MSG"/>
            <enumeration value="WAS_ACTIVITY_LOG"/>
            <enumeration value="WAS_MSG"/>
            <enumeration value="UNKNOWN_MSG"/>
        </restriction>
    </simpleType>
</schema>
```

```xml
<?xml version="1.0" encoding="UTF-8"?>
<schema targetNamespace="http://OutputStructure.xsd">
    <element name="OutputStructure">
        <complexType>
            <sequence>
                <element ref="Fields" maxOccurs="unbounded"/>
            </sequence>
            <attribute name="separator" use="required" type="string"/>
            <attribute name="hashing" use="optional" type="string"/>
        </complexType>
    </element>
    <element name="Fields">
        <complexType>
            <sequence>
                <element ref="GroupsMsgDataElement" minOccurs="0"
                    maxOccurs="1"/>
                <element ref="RuleAttCreationTime"/>
                <element ref="RuleAttSeverity"/>
            </sequence>
            <attribute name="Match" type="string"/>
            <attribute name="Substitute" type="string"/>
            <attribute name="Split" type="string"/>
            <attribute name="Name" type="string"/>
            <attribute name="Description" type="string"/>
        </complexType>
    </element>
    <element name="RuleAttCreationTime">
        <complexType>
            <sequence>
                <element ref="Subs" minOccurs="1"
                    maxOccurs="unbounded"/>
            </sequence>
            <attribute name="Value" type="string" use="optional"/>
        </complexType>
    </element>
    <element name="Subs">
        <complexType>
            <attribute name="Positions" type="string"/>
            <attribute name="Match" type="string"/>
            <attribute name="Substitute" type="string"/>
            <attribute name="TimeFormat" type="string"/>
        </complexType>
    </element>
</schema>
```

METHODS AND APPARATUS FOR CREATION OF PARSING RULES

CROSS REFERENCE TO RELATED APPLICATION

The present application is related to the U.S. patent application identified as Ser. No. 10/334,254, filed on Oct. 23, 2002, and entitled "Smart Event Parser Using Self-Learning and Self-Configuration," the disclosure of which is incorporated by reference herein.

FIELD OF THE INVENTION

The present invention relates generally to the field of autonomic computing and, more particularly, to the generation of parsing rules for use in a rule-based system such as an event message adaptation system.

BACKGROUND OF THE INVENTION

Effective management of event messages is the cornerstone of high quality information technology (IT) service delivery.

Intense competition among IT service providers to demonstrate high quality service management (e.g., low response times, high availability) has led to very aggressive goals for IT-based services. Realizing these goals requires proactive management processes which provide early detection and isolation of IT event messages signaling service delivery problems. As IT service providers are forced by an extremely competitive market to aggressively control cost of service delivery, the automation of these processes becomes increasingly critical. This capability of automated event detection, problem isolation and resolution is a key aspect of an autonomic computing strategy. This is especially the case for complex IT systems comprising distributed, heterogeneous components.

As is known, "autonomic computing" is a comprehensive and holistic approach to self-managed computing systems with a minimum of human interference, e.g., see P. Horn, "Autonomic Computing: IBM's Perspective on the State of Information Technology," IBM Research, October 2001, the disclosure of which is incorporated by reference herein.

Real-time, high-performance event management systems universally require transformation of the incoming event data to a common format prior to application of event processing logic. This transformation from unique formats to a common format is controlled by parsing rules.

Creation of parsing rules that transform event data into a unified format has traditionally been a very time consuming exercise that requires technology domain experts to develop unique parsing rules for all event messages. In the past, parsing has often been addressed manually by creating ad-hoc parsers directed to event logs of specific technologies and applications.

Several problems exist with such an approach. First, the manual approach involves a time-consuming, error prone process. Second, the manual approach requires a user to have both: (1) domain knowledge in understanding data formats; and (2) programming knowledge in translating domain knowledge into event data parsing rules.

In addition, the manual approach has been rendered ineffective by significant challenges emerging from the present day IT environment.

A critical challenge in the deployment of autonomic event management methods and systems is the need for the solution to address very large numbers of events in real-time, support a broadening spectrum of event message formats, and recognize and process individually thousands of unique event messages.

The most onerous issue is event volume. Many IT operations centers report volumes of one million or more events per day. More IT users are reaching that plateau each month. Unfortunately, users lack a process for collection, parsing and extraction of pertinent event data which effectively addresses this scaling issue.

The IT industry has introduced a broad range of proprietary and standardized event protocols, log file formats, and (even within a single protocol) syntax. The variety of formats assumed by event messages adds considerable complexity to the event data environment of the user. Viewed from a practical data management perspective, the variety in event formats will add significantly to the effort the customer will be required to invest in development of data parsing rules.

Further, the torrent of events generated across the IT environment of the user is composed of thousands of unique event types, each containing potentially important management information and each, potentially, requiring unique parsing rules.

To summarize, many users contend with more than a million event messages per day. Their event streams contain a multitude of differing data protocols and formats. The individual events within these event streams represent thousands of unique event types. Traditional labor intensive approaches to the parsing analysis of this mass of event data are inadequate.

Thus, a need exists for parsing rule creation techniques that are supported with automated facilities such that the above-mentioned and other limitations may be overcome.

SUMMARY OF THE INVENTION

The present invention provides techniques for parsing rule creation that are supported with automated facilities such that the above-mentioned and other limitations may be overcome. Advantageously, the invention allows a system implementing such techniques to realize gigabyte data reduction.

In a first illustrative aspect of the invention, a technique for constructing one or more message parsing rules comprises the following steps. First, message data representing past messages, for example, associated with a network, an application and/or a system being analyzed, is obtained. For example, this may involve reading the past or historical message data from messages logs or having a system point to the message data in existing data storage. Parsing rules are then generated by a process from one or more existing rule templates and/or based on user selection and classification of at least a portion of a message. For example, the user may choose a message part and demonstratively classify the part, for example, as a positive or negative example. The generated rules may then be stored for access by a rule-based parsing system such as a message adaptation system.

Prior to generation of the one or more parsing rules, a message structure may be established upon which generation of the rules may be based. Thus, in a second illustrative aspect of the invention, when one or more previously generated templates are available, the step of establishing a message structure may comprise the following steps. First, a skeleton of the message may be created. A skeleton may, for example, contain information about message start, message end, separation between fields, and some additional information about the message. Next, previously generated templates may be matched against the message skeleton. Then, possible matches may be provided to the analyst for validation and choice of proper message structure. Next, if the structure of the message is found to be insufficient, templates may be built by an iterative process between analyst (human) and machine (computer system) based on the analyst's choice of a part of the message and possibly additional demonstrative classification of the chosen part as a positive or negative example. Lastly, the approved message structure may be output as a possible message structure template.

In a third illustrative aspect of the invention, the step of building parsing rules iteratively by demonstration, possibly based on positive or negative examples, may comprise the following steps. First, a machine may parse message data sequentially until it encounters the end of the data or an unparseable message. An unparseable message may be displayed in a log viewer. Then, the analyst may define an example, e.g., the analyst selects part of the message, possibly comprising multiple segments, and marks the selected part as a positive or negative example. Next, the machine may learn based on the example, e.g., the machine may create possible rules based on rule templates, a knowledge base, and the output message structure, covering positive examples but not containing negative examples and shows the created rule templates to the analyst in the form of a priority list. The analyst may choose from templates and define a mapping based on the output structure. Next, the machine may refine and verify the rule. The rule may then be added to the parsing rules and run against all data. Parsing results or parsing errors may be shown to the analyst. Lastly, the analyst may make a final decision, e.g., the analyst accepts or rejects the rule. An accepted rule may be added to the parsing rules. These steps may be repeated until all messages are parsed without errors.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a diagram illustrating a message structure schema according to an embodiment of the present invention;

FIG. 7 is a diagram illustrating a message output schema according to an embodiment of the present invention.

DETAILED DESCRIPTION OF PREFERRED EMBODIMENTS

The present invention will be described below in the context of an exemplary message adaptation system. However, it is understood that the invention is not limited to use with a message adaptation system but is rather more generally applicable for use in accordance with any rule-based parsing system in which it is desirable to provide automated parsing rule construction capabilities.

Figure 1:
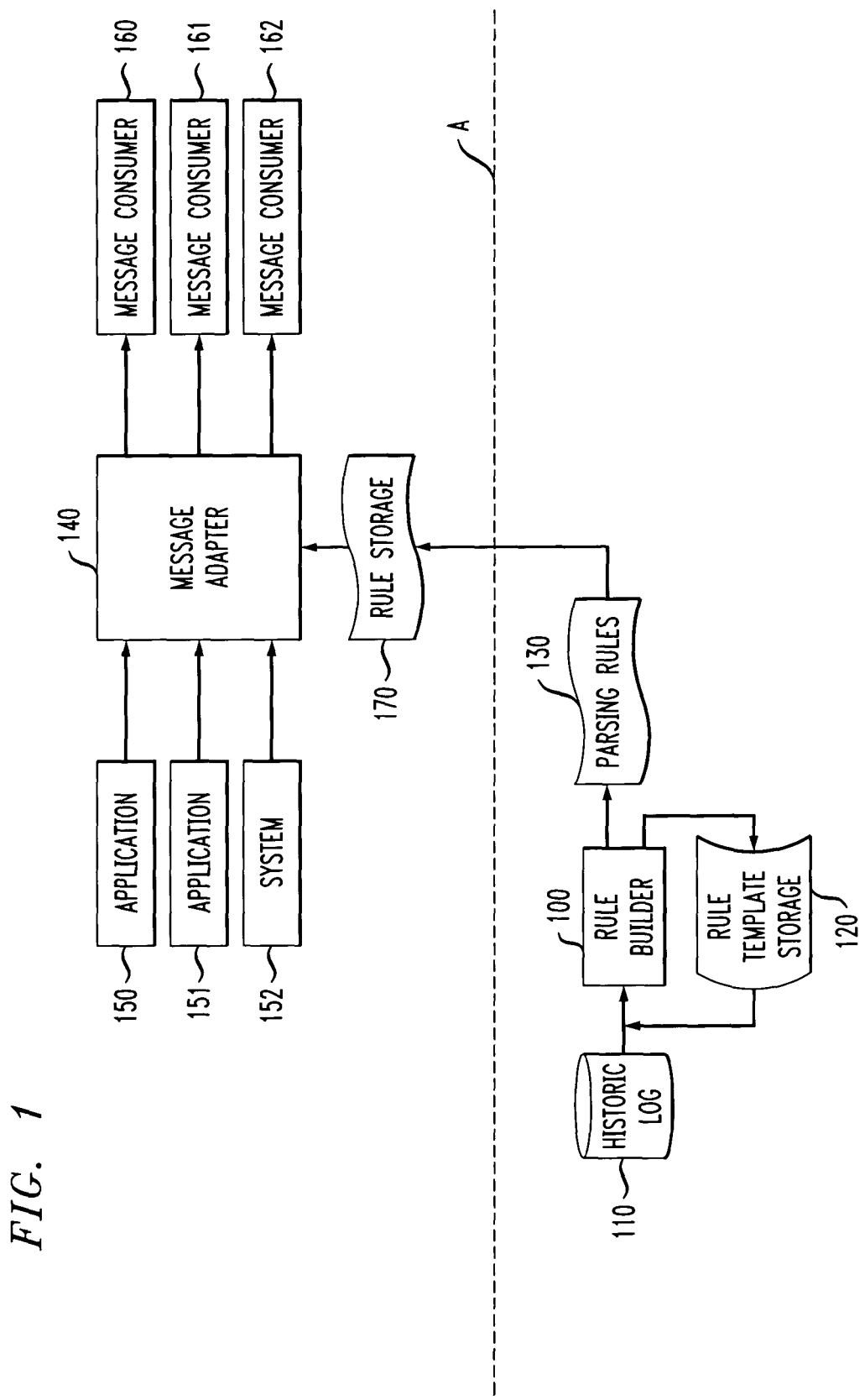
FIG. 1 is a block diagram illustrating a rule building system and a message adaptation system with which the rule building system may be implemented according to an embodiment of the present invention.

Referring initially to FIG. 1, a block diagram illustrates a parsing rule building system and a message adaptation system with which the rule building system may be implemented according to an embodiment of the present invention. As shown, dotted line A serves to demarcate the rule building system from a computing system using a message adaptation system, i.e., the rule building system is below line A and the computing system using the message adaptation system is above line A.

Thus, as depicted in FIG. 1, items 150, 151, 152, 160, 161 and 162 represent a distributed computing system in which message adapter 140 operates by translating logs of software applications 150, 151 and system 152 into a common format understood by message consumers 160, 161 and 162 according to the subscription procedure of the message consumers. In order to operate, message adapter 140 uses parsing rules stored in rule storage 170.

In general, rule builder 100 builds parsing rules offline for the distributed computing system. It is to be understood that the techniques employed by rule builder 100 may interact with the distributed computing system in two ways.

First, rule builder 100 reads historical logs 110 provided by applications 150, 151 and/or system 152, or accesses message data directly from applications 150, 151 and/or system 152. Rule builder 100 uses rule template storage 120 to store rule templates for present and future rule construction. Thus, rule builder 100 extracts rule templates from rule template storage 120 at the beginning of the parsing rule construction process and stores newly created rules at the end of the rule construction process. Results of the parsing rule construction process are stored in parsing rules file 130 and then transferred to rule storage 170. The stored rules are then used online by message adapter 140 in the applications and system logs translation process such that event data is translated into a common format understood by the message consumers.

Figure 2:
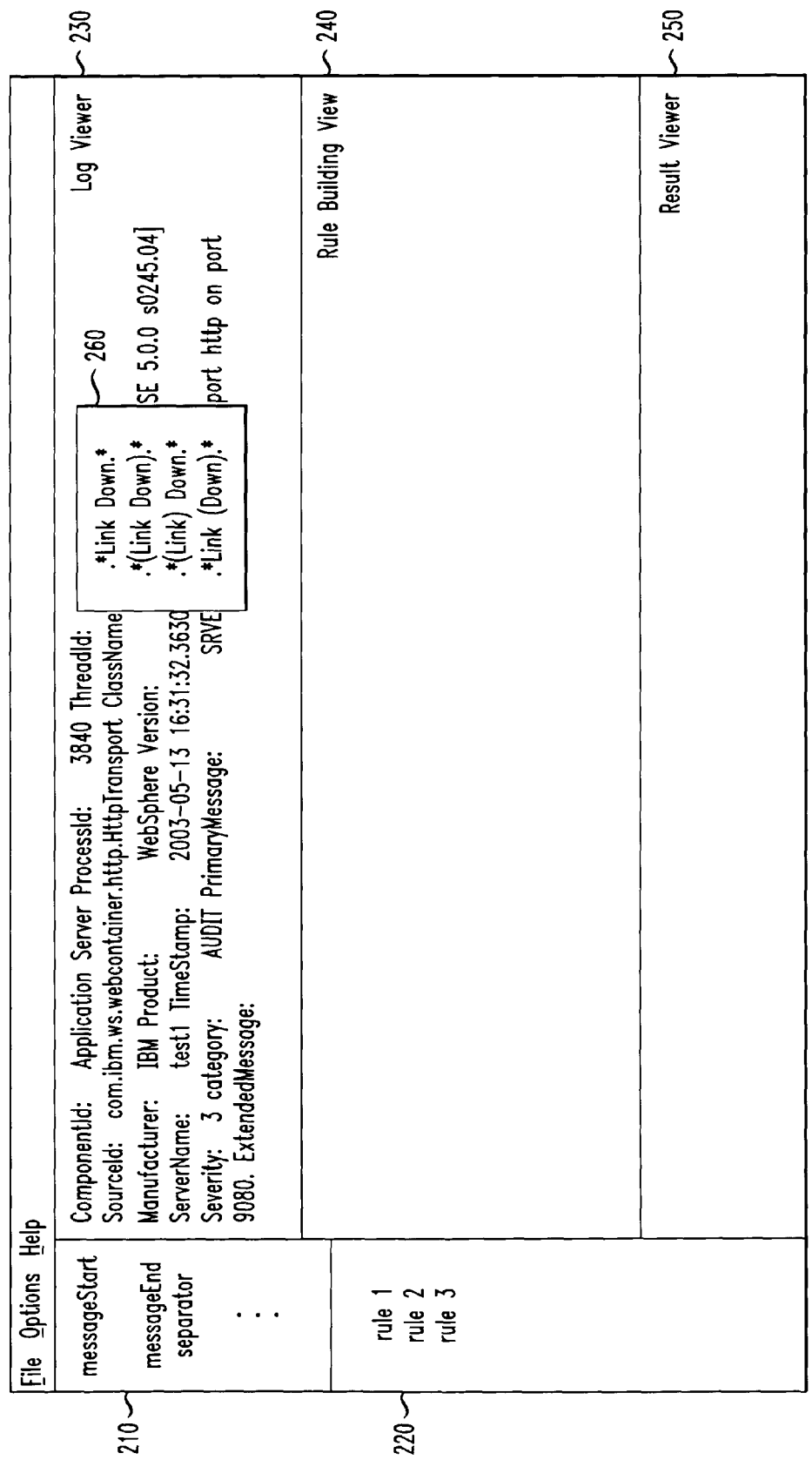
FIG. 2 is a diagram illustrating an exemplary rule building application mark-up according to an embodiment of the present invention.

Referring now to FIG. 2, a diagram illustrates an example of a rule building application mark-up or graphical user interface (GUI) for use in accordance with rule builder 100 (FIG. 1). More specifically, the figure illustrates panels (viewers) used by rule builder 100 to construct parsing rules in accordance with user interaction and feedback.

Panel 210 displays the current message structure (described below in the context of FIG. 4) which contains message start, message end, separator and other information useable to identify individual messages.

Panel 220 lists currently active parsing rules according to the output structure (described below in the context of FIG. 7). New rules according to the output structure can be added into the list and existing rules can be edited or removed from the list by an analyst (user).

Panel (log viewer) 230 displays one message, as defined by the message structure, and allows an analyst to select a part of the message composed of, for example, multiple segments in order to describe an example to be classified as positive or negative to construct matching pattern templates 260. Selection of a message segment may be performed, by way of example only, by the user changing font types, font sizes, font colors, font styles and/or background colors, and/or by adding cross-out lines or underlines, with respect to the text in the message segment. The matching pattern templates can be (but are not limited to) regular expressions or position-based descriptions of the message segments.

Panel (rule building view) 240 presents the parsing rule currently under construction, which may include a machine pattern and a transformation rule. A transformation rule specifies the method of transforming the matched message segments to a normalized format by (but not limited to) selection, permutation, and/or assigning of a string constant (or input token) as output. The user can refine the rule manually.

Panel (result viewer) 250 shows the effect of the matching rule to the current message and the transformation rule and keeps them updated when the user changes the parsing rule. If one (or some) of the rules generates a parsing error, the parsing error information is displayed in result viewer 250.

Figure 3:
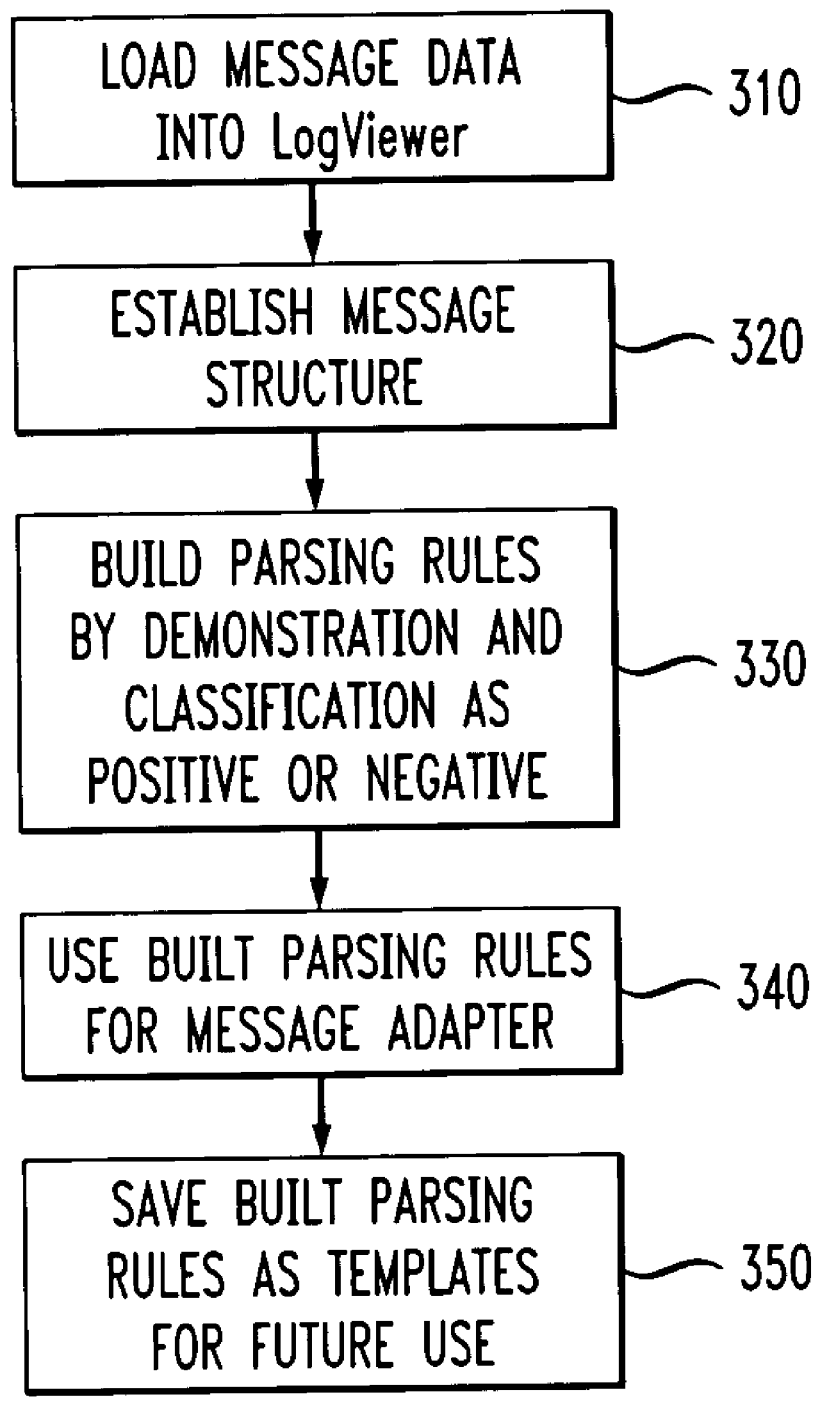
FIG. 3 is a control flow diagram of rule generation according to an embodiment of the present invention.

Referring now to FIG. 3, a control flow diagram illustrates a systematic parsing rule construction methodology according to embodiment of the present invention. It is to be appreciated that the methodology depicted in FIG. 3 may be carried out by an analyst and a computer system (machine), or just by a computer system. Thus, as is evident, the methodology may be performed entirely in accordance with the machine (automated approach). However, the present invention realizes that benefits may be derived by providing use of the parsing rule construction system of the invention to a human expert (analyst or administrator) to systematically extract parsing rules from historical data (semi-automated approach).

It is to be noted that during the descriptions to follow, parenthetical reference will be made back to elements described above in the context of FIGS. 1 and 2.

In step 310, rule builder (100 of FIG. 1) loads historical data (110 of FIG. 1) into the log viewer (230 of FIG. 2). Historical data is data provided by applications (150, 151 of FIG. 1), a system (152 of FIG. 1) and/or a network. The historical data may be message data representing past messages associated with the network, the applications and/or the system being analyzed. For example, this may involve reading the past or historical message data from message logs or having a system (or application or network) point to the message data in existing data storage.

In step 320, a message structure is established. More particularly, an appropriate rule template for the message structure is established. Details of a process for establishing message structure are described below in the context of FIG. 5.

In step 330, the rule builder and analyst, based on his or her experience, build parsing rules by demonstration and classification of examples as positive or negative, i.e., by the user demonstrating to the machine what information (e.g., by way of classifying examples) the machine should use to generate parsing rules. More particularly, based on the message structure, parsing rules are generated by an iterative refinement process from existing templates or based on user choice of the message part and classification of the part as a positive or negative example. Details of a process for building the parsing rules is described below in the context of FIG. 6.

In step 340, built parsing rules are saved to a file (130 of FIG. 1) and passed to rule storage (170 of FIG. 1) to be used by a message adapter (140 of FIG. 1).

In step 350, built parsing rules are saved by the rule builder (100 of FIG. 1) as templates (120 of FIG. 1) for future parsing rule constructions.

FIG. 4 is a diagram illustrating a mapping in the XML (Extensible Markup Language) schema of a message structure description according to an embodiment of the present invention.

More particularly, FIG. 4 illustrates a description 400 of the message structure that may be used and/or stored as part of the parsing rules (130 of FIG. 1). The description comprises attributes used in the message structure. Attributes may include, but are not limited to:

(i) attribute "messageStart" which describes the start of the message in a unique way with the respect to given historical message data;

(ii) attribute "multiline" which takes value true when a message is represented in the historical data by multiple lines, and false if the message is represented in the historical data by a single line;

(iii) attribute "eventEnd" is an optional attribute and it describes the end of a valid message in a unique way for the specific historical data;

(iv) attribute "separator" describes how different fields of the message are separated one from another for the specific historical log;

(v) attribute "glueing" is optional and is used for multiline logs to combine a number of separate lines contributing to the message into one line for further rule construction;

(vi) attribute "msgType" helps to classify different logs on a high level, and may have values, for example, such as "TEC_RECEPTION_MSG", "DB2_MSG", "DB2_DIAG_MSG", "WAS_MSG", "WAS_ACTIVITY_MSG", and default value "UNKNOWN_MSG".

Figure 5:
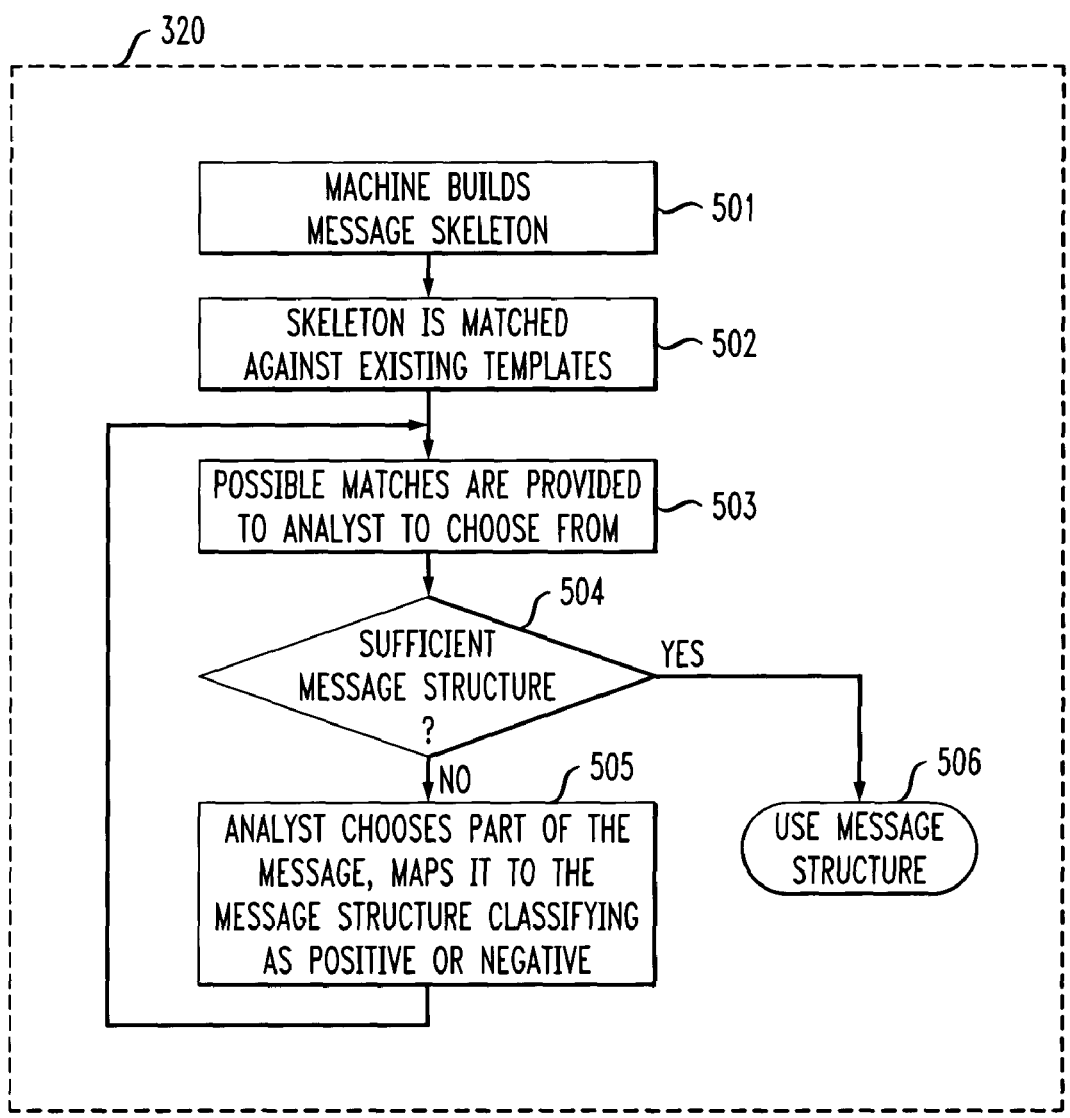
FIG. 5 is a flow diagram illustrating a methodology of establishing message structure according to an embodiment of the present invention.

Referring now to FIG. 5, a flow diagram illustrates a methodology of building or establishing message structure according to an embodiment of the present invention. FIG. 5 may be considered a detailed explanation of step 320 of FIG. 3. Thus, when one or more previously generated message structure templates are available, establishing message structure may comprises the following steps.

In step 501, the machine scans the historical message data, builds a skeleton of the message, and proposes a possible working message structure. A message skeleton may, for example, contain information about message start, message end, separation between fields, and some additional information about a message.

An example of a message skeleton and a template in the context of learning a separator in a message structure is as follow:

(1) the frequency of each character that can be considered as a separator is counted. Here, all special characters, such as ":", ";" and a white (blank) space, are possible candidates for a separator.

(2) the candidate with the highest count is regarded as a separator. In our example, a space occurs the most. So, the methodology selects space as a separator. Similar mechanism can be developed for other parameters of the message structure.

Thus for the message:

"Jul 23 2003 05:49:30 somehostname TRIALINFO this is sample single line message", the skeleton will be WSWSWSWSWSWSWSWSWSWSWSW, where W stands for a word, S stands for the separator, and the value of the separator is one or more white spaces. Thus, the template in this case will be:

multiline=false messagestart=^

Separator=\s+

Next, in step 502, the machine compares the proposed message structure with existing message structure templates. That is, previously generated message structure templates are matched against the message skeleton.

In step 503, the machine then selects a set of the most likely message structures and presents them to the analyst. That is, possible matches are provided to the analyst for validation and choice of proper message structure.

Next, in step 504, the analyst selects a message structure from the provided set of message structure templates, and the machine decides whether the current message structure contains enough information to identify individual messages.

If not, the machine prompts the analyst to provide positive or negative examples, in step 505, until enough information is gathered and a valid message structure is produced for use (step 506) in parsing rules construction (step 330 of FIG. 3).

That is, if the structure of the message is found to be insufficient, one or more message structure templates are built by an iterative process between analyst and machine based on analyst choice of part of the message, wherein the message possibly comprises multiple segments, and maybe based on additional classification of the chosen part as a positive or negative example. The approved message structure is output as a possible (candidate) message structure template.

Figure 6:
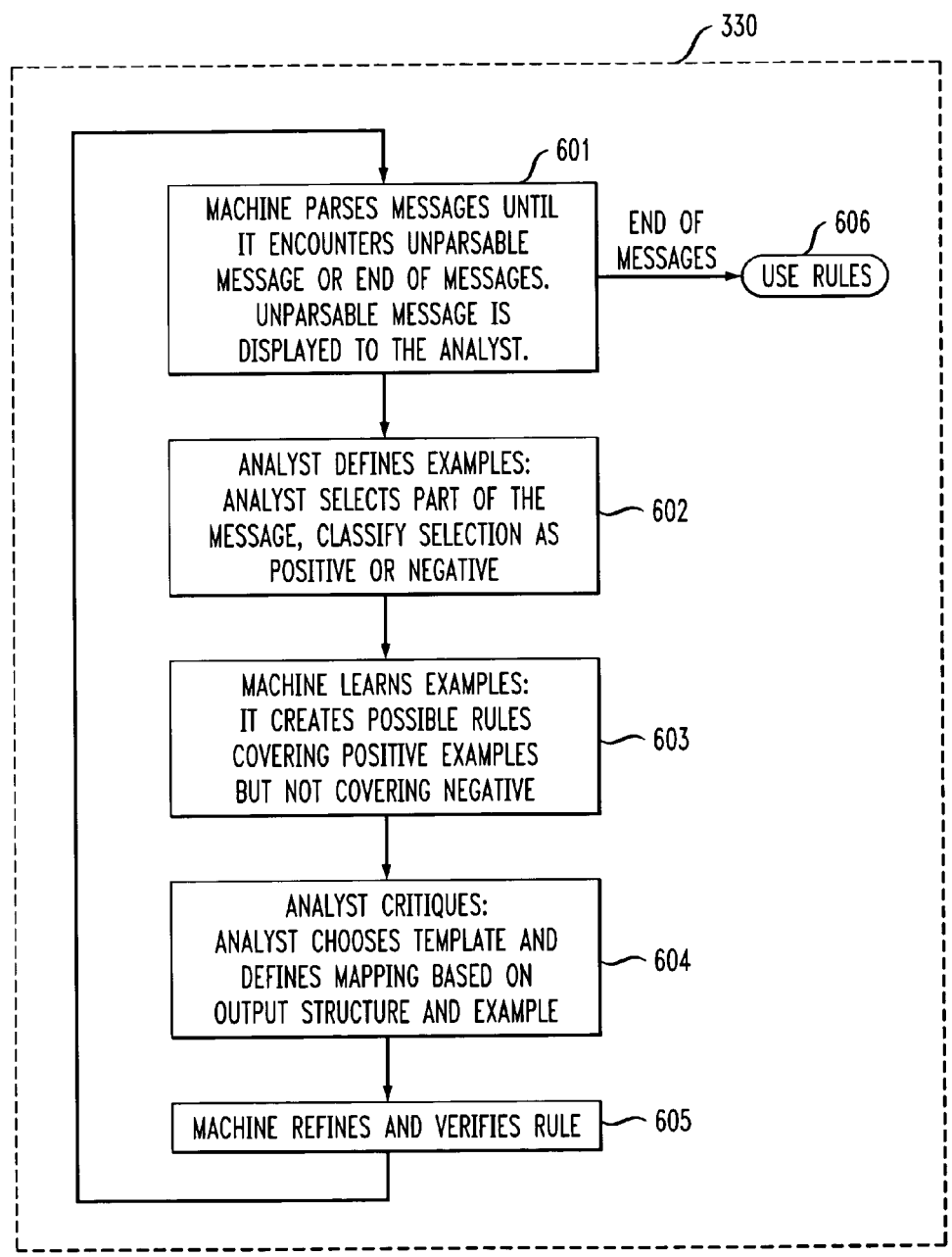
FIG. 6 is a flow diagram illustrating a methodology of building parsing rules by demonstration using positive and negative examples according to an embodiment of the present invention.

Referring now to FIG. 6, a flow diagram illustrates a methodology of building parsing rules by demonstration using positive and negative examples according to an embodiment of the present invention. FIG. 6 may be considered a detailed explanation of step 330 of FIG. 3. The following steps may be repeated until whole historical message data is parsed without parsing errors, and the analyst finds the result of the parsing process satisfactory.

In step 601, the machine parses messages until it encounters a message generating error during parsing (i.e., the machine is unable to parse a message), or until it reaches the end of the data. The unparseable message is displayed to the analyst in the log viewer (230 of FIG. 2).

Next, in step 602, the analyst defines examples to be used for purposes of learning. The analyst selects part of the message (possibly comprising multiple segments) to be considered as an example. Next, the analyst classifies selection as a positive or a negative example.

In step 603, the machine learns the example. Traditional machine learning techniques may be employed such as, for example, those disclosed in "Discovery of Frequent Episodes in Event Sequences, Data Mining and Knowledge Discovery, 1(3), 1997; "Mining Association Rules Between Sets of Items in Large Databases," VLDB, pp. 207-216, 1993; "Mining Sequential Patterns: Generalization and Performance Improvements," Proc. of the Fifth Int'l Conference on Extending Database Technology, Avignon, France, 1996; and "Machine Learning," Tom Mitchell, 1997, the disclosures of which are incorporated by reference herein.

Thus, in accordance with one or more machine learning techniques, the machine may create possible (candidate) parsing rule templates covering positive examples, but not including negative examples. Possible parsing rule templates are shown in panel 260 of FIG. 2. More particularly, the machine may create possible rules based on rule templates, a knowledge base, and the output message structure, covering positive examples but not containing negative examples and show the created rule templates to the analyst in the form of a priority list.

Next, in step 604, the analyst critiques and modifies, if necessary, the parsing rule templates. The analyst chooses templates most appropriate from the set of parsing rule templates provided by the machine. The chosen template is then shown in the rule building view (240 of FIG. 2). The analyst modifies, if necessary, the rule template to create the parsing rule. That is, the analyst may choose from templates and define a mapping based on the output structure.

In step 605, the machine refines and verifies the parsing rule by applying the parsing rule to the current message. The result of the application is shown in the result view (250 of FIG. 2) in the form of either a result of application of the parsing rule or as a parsing error. In the case of no parsing error and if the analyst is satisfied with the result, the machine returns to step 601 to proceed with parsing. Further, in the case when the analyst is satisfied with results, the machine uses (step 606) and saves parsing rules (see steps 340 and 350 of FIG. 3).

That is, in accordance with step 605, a newly created rule is added to the parsing rules and run against all data. Parsing results or parsing errors are shown to the analyst. The analyst makes the final decision, i.e., the analyst accepts or rejects the rule. An accepted rule is added to the parsing rules. These steps are repeated until all messages are parsed without errors.

We now give an illustration of the process of learning by demonstration, in the context of the steps of FIG. 6, through a simple example in which a user only selects one message portion as a positive example and wishes to define a message type ("msgType" as mentioned above).

Step 601: a new message is shown in log viewer:
1054304804 3 Fri May 30 10:26:44 2003 sampleHost A Cisco Link Down trap received from enterprise cisco-stack;

Step 602: analyst selects (by bolding text, as shown) a part of message in log viewer:
1054304804 3 Fri May 30 10:26:44 2003 sampleHost A Cisco Link Down trap received from enterprise cisco-stack;

Step 603: machine provides multiple rules expressed as regular expressions:
(1) matching: (\w*) Down (\w*) received.*; messageType: $1_down,
(2) matching: (\w*) (\w*) (\w*) received.*; messageType: $1_$2,
(3) . . . etc.;

Step 604: analyst critiques by choosing proper template (e.g., template associated with rule (1) above) and modifying it, if needed; and Step 605: machine refines and verifies the rule by applying rule to the record (current message) and showing result (in this case, Link_Down) in the result viewer.

FIG. 7 is a diagram illustrating a mapping in the XML schema of an output message structure description 700 according to an embodiment of the present invention.

The output message structure describes an element containing a set of the sub-elements with the name "Fields". In addition, element "OutputStructure" contains the following attributes: attribute "separator" which is used for the description of the fields' separator and attribute "hashing" which is used for description of hashing representation of an attribute—value format of the message. Each sub-element "Fields" corresponds to required or optional fields of the OutputStructure.

Element "Fields" is illustrated as having sub-elements of two types: "Groups" and "RuleAttribute". "Groups" sub-elements correspond to the sub-element that may have sub-elements of "Groups" type or "RuleAttribute" type and used for grouping together multiple sub-elements. "RuleAttribute" sub-elements correspond to the attributes that are expected to be in the output message. "Groups" and "RuleAttribute" are elements that are shown in panel 220 of FIG. 2. "RuleAttCreationTime" is an illustration of the "RuleAttribute" and corresponds to the message timestamp attribute.

Figure 8:
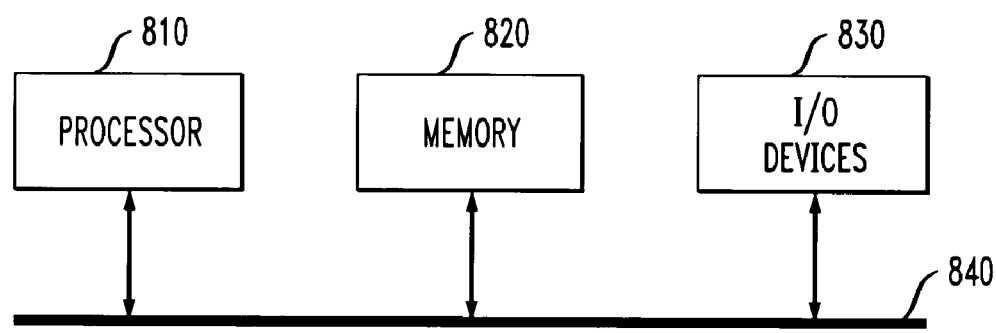
FIG. 8 is a block diagram illustrating a generalized hardware architecture of a computer system suitable for implementing a rule building system according to the present invention.

Referring now to FIG. 8, a block diagram is shown illustrating a generalized hardware architecture of a computer system suitable for implementing the various functional components/modules and methodologies of a parsing rule building system and a message adaptation system as depicted in the figures and explained in detail herein. That is, the computer system shown in FIG. 8 may be considered to be the "machine" with which an analyst interacts, as described above in detail. It is to be understood that the individual components/modules and methodologies of the systems may be implemented on one such computer system, or on more than one separate such computer system. Also, individual components of the system may be implemented on separate such computer systems. It is to be appreciated that the user may interact directly with the one or more computer systems implementing the systems. Alternatively, the user may employ a computer system in communication (e.g., via a remote or local network) with the one or more computer systems implementing the systems in order to interact with the systems.

As shown, the computer system may be implemented in accordance with a processor 810, a memory 820 and I/O devices 830, coupled via a suitable computer bus or network 840. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data (e.g., user selections and examples, etc.) to the processing unit, and/or one or more output devices (e.g., CRT display, printer, etc.) for presenting results (e.g., parsing rule generation results, parsing results, etc.) associated with the processing unit. For example, system user interfaces (e.g., FIG. 2) employed by the user may be realized through such I/O devices. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of constructing one or more message parsing rules in accordance with a user and a machine, comprising the steps of:

obtaining message data representing past messages, wherein the past messages contain management information for a network, an application, and a system being analyzed;

establishing an appropriate rule template for a message structure by scanning the message data, building a message skeleton, comparing previously generated rule templates to the message skeleton, providing potential rule template matches to the user for validation and choice of a selected rule template, determining whether the selected rule template contains enough information to identify individual messages, building a rule template through an iterative process between the user and the machine based on user selection of at least a portion of the message and designating the built rule template as a template to be used in the construction of one or more message parsing rules, when the selected rule template does not contain enough information, and designating the selected rule template as a template to be used in the construction of one or more message parsing rules; and generating one or more message parsing rules by a process based on the obtained message data and the template to be used in the construction of one or more message parsing rules, and defining positive and negative examples in an unparseable message by the user, learning and creating possible rules covering positive examples at the machine, and adding a newly created rule to the one or more message parsing rules, wherein the one or more parsing rules are storable for access by a rule-based parsing system.

2. The method of claim 1, wherein the message data is obtained by at least one of: (i) reading past message data from one or more messages logs; and (ii) one of the network, the application and the system pointing to message data in existing data storage.

3. The method of claim 1, wherein the rule-based parsing system comprises a message adaptation system.

4. The method of claim 1, further comprising the step of establishing a message structure prior to the generating step.

5. The method of claim 1, wherein the iterative process further comprises demonstrative classification of the selected portion as one of a positive example and a negative example.

6. The method of claim 1, wherein the message skeleton comprises information relating to one or more of a message start, a message end, and a separator between fields.

7. The method of claim 1, wherein classification comprises user demonstration of at least one of a positive example and a negative example.

8. The method of claim 7, wherein classification further comprises the steps of:

the machine parsing message data sequentially until an unparseable message is encountered;

the machine displaying the unparseable message to the user;

the user selecting at least a portion of the unparseable message and marking the selected portion as one of a positive example and a negative example; and the machine learning based on the example and creating one or more candidate rules.

9. The method of claim 8, further comprising the step of the machine revising the one or more candidate rules based on feedback from the user.

10. The method of claim 1, wherein each of the one or more generated parsing rules comprises a regular expression of a portion of a message.

11. The method of claim 1, wherein each of the one or more generated parsing rules comprises a transformation rule of a portion of a message.

12. The method of claim 11, wherein the transformation rule comprises a swing constant.

13. The method of claim 11, wherein the transformation rule comprises a permutation of one or more input tokens.

14. Apparatus for constructing one or more message parsing rules, comprising:
a memory; and
at least one machine-based processor coupled to the memory and operative to: (i) obtain message data representing past messages, wherein the past messages contain management information for a network, an application, and a system being analyzed; (ii) establish an appropriate rule template for a message structure by scanning the message data, building a message skeleton, comparing previously generated rule templates to the message skeleton, providing potential rule template matches to the user for validation and choice of a selected rule template, determining whether the selected rule template contains enough information to identify individual messages, building a rule template through an iterative process between the user and the machine based on user selection of at least a portion of the message and designating the built rule template as a template to be used in the construction of one or more message parsing rules, when the selected rule template does not contain enough information, and designating the selected rule template as a template to be used in the construction of one or more message parsing rules; and (iii) generate one or more message parsing rules by a process based on the obtained message data and the template to be used in the construction of one or more message parsing rules, and defining positive and negative examples in an unparseable message by the user, learning and creating possible rules covering positive examples at the machine, and adding a newly created rule to the one or more message parsing rules, wherein the one or more parsing rules are storable for access by a rule-based parsing system.

15. The apparatus of claim 14, wherein the rule-based parsing system comprises a message adaptation system.

16. The apparatus of claim 14, wherein classification comprises user demonstration of at least one of a positive example and a negative example.

17. The apparatus of claim 16, wherein classification further comprises operations of:
the at least one machine-based processor parsing message data sequentially until an unparseable message is encountered;
the at least one machine-based processor displaying the unparseable message to a user;
the user selecting at least a portion of the unparseable message and marking the selected portion as one of a positive example and a negative example; and
the at least one machine-based processor learning based on the example and creating one or more candidate rules.

18. An article of manufacture for constructing one or more message parsing rules in accordance with a user and a machine, comprising a machine readable storage medium containing one or more programs which when executed implement the steps of:
obtaining message data representing past messages, wherein the past messages contain management information for a network, an application, and a system being analyzed;
establishing an appropriate rule template for a message structure by scanning the message data, building a message skeleton, comparing previously generated rule templates to the message skeleton, providing potential rule template matches to the user for validation and choice of a selected rule template, determining whether the selected rule template contains enough information to identify individual messages, building a rule template through an iterative process between the user and the machine based on user selection of at least a portion of the message and designating the built rule template as a template to be used in the construction of one or more message parsing rules, when the selected rule template does not contain enough information, and designating the selected rule template as a template to be used in the construction of one or more message parsing rules; and
generating one or more message parsing rules by a process based on the obtained message data and the template to be used in the construction of one or more message parsing rules, and defining positive and negative examples in an unparseable message by the user, learning and creating possible rules covering positive examples at the machine, and adding a newly created rule to the one or more message parsing rules, wherein the one or more parsing rules are storable for access by a rule-based parsing system.

* * * * *

UNITED STATES PATENT AND TRADEMARK OFFICE
CERTIFICATE OF CORRECTION

| | |
|---|---|
| PATENT NO. | : 7,343,604 B2 |
| APPLICATION NO. | : 10/627824 |
| DATED | : March 11, 2008 |
| INVENTOR(S) | : G. Grabarnik et al. |

It is certified that error appears in the above-identified patent and that said Letters Patent is hereby corrected as shown below:

In the claims:

Claim 12, column 11, line 16, delete "swing" and insert --string--

Signed and Sealed this

Twenty-fourth Day of June, 2008

JON W. DUDAS
*Director of the United States Patent and Trademark Office*